United States Patent
Seo et al.

(10) Patent No.: US 12,368,367 B2
(45) Date of Patent: Jul. 22, 2025

(54) STARTUP METHOD OF SEMICONDUCTOR TRANSFORMER, AND CONVERTER USING SAME

(71) Applicant: HYOSUNG HEAVY INDUSTRIES CORPORATION, Seoul (KR)

(72) Inventors: Hae Won Seo, Seoul (KR); Byeng Joo Byen, Suwon-si (KR); Jae Hyuk Kim, Gwacheon-si (KR); Sung Joo Kim, Goyang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 420 days.

(21) Appl. No.: 18/002,304

(22) PCT Filed: Nov. 11, 2021

(86) PCT No.: PCT/KR2021/016427
§ 371 (c)(1),
(2) Date: Dec. 19, 2022

(87) PCT Pub. No.: WO2022/103167
PCT Pub. Date: May 19, 2022

(65) Prior Publication Data
US 2023/0353032 A1  Nov. 2, 2023

(30) Foreign Application Priority Data
Nov. 12, 2020 (KR) .................. 10-2020-0151348

(51) Int. Cl.
*H02M 1/36* (2007.01)
*H02M 1/00* (2006.01)
(Continued)

(52) U.S. Cl.
CPC ......... *H02M 1/0022* (2021.05); *H02M 1/007* (2021.05); *H02M 1/0074* (2021.05);
(Continued)

(58) Field of Classification Search
CPC ...... H02M 1/00; H02M 1/0022; H02M 1/007; H02M 1/0074; H02M 1/08; H02M 1/32;
(Continued)

(56) References Cited

U.S. PATENT DOCUMENTS

2006/0233000 A1   10/2006  Akagi
2012/0176816 A1*  7/2012   Seel ................... H02M 1/36
                                              363/21.01
(Continued)

FOREIGN PATENT DOCUMENTS

JP   2017-147812 A   8/2017
JP   2019-106790 A   6/2019
(Continued)

OTHER PUBLICATIONS

Mariam Saeed; Alberto Rodríguez; Manuel Arias; Fernando Briz; José Maria Cuartas; "Energization and Start-up of Modular Three-stage Solid State Transformers"; Sep. 13, 2018; IEEE; 2018 IEEE 19th Workshop on Control and Modeling for Power Electronics (COMPEL) (Year: 2018).*

(Continued)

*Primary Examiner* — Thienvu V Tran
*Assistant Examiner* — Shahzeb K Ahmad
(74) *Attorney, Agent, or Firm* — NKL Law; Jae Youn Kim

(57) ABSTRACT

A startup method of a semiconductor transformer, according to the present invention, comprises: a link capacitor initiating step in which a control unit controls a link capacitor voltage of a link capacitor between an AC/DC converter and a DC/DC converter connected thereto in series to reach an initial reference value, and stores link power; an output capacitor initiating step in which the control unit controls an output capacitor voltage of an output capacitor configured in an output of the DC/DC converter to reach an initial refer- (Continued)

ence value, and stores output power; a link capacitor stabilizing step in which the control unit controls the link capacitor such that the link capacitor voltage of the link capacitor reaches a stable reference value; and an output capacitor stabilizing step in which the control unit controls the output capacitor such that the output capacitor voltage of the output capacitor reaches a stable reference value.

3 Claims, 8 Drawing Sheets

(51) Int. Cl.
*H02M 1/08* (2006.01)
*H02M 3/335* (2006.01)
*H02M 7/217* (2006.01)
*H02M 7/04* (2006.01)

(52) U.S. Cl.
CPC ............... *H02M 1/08* (2013.01); *H02M 1/36* (2013.01); *H02M 3/335* (2013.01); *H02M 3/33507* (2013.01); *H02M 7/217* (2013.01); *H02M 7/04* (2013.01)

(58) Field of Classification Search
CPC .......... H02M 1/36; H02M 3/28; H02M 3/335; H02M 3/33507; H02M 3/33592; H02M 5/40; H02M 5/45; H02M 5/458; H02M 7/04; H02M 7/12; H02M 7/125; H02M 7/155; H02M 7/162; H02M 7/21; H02M 7/217; H02M 7/219
See application file for complete search history.

(56) References Cited

U.S. PATENT DOCUMENTS

| 2015/0043253 | A1* | 2/2015 | Awane | H02M 5/4585 |
| | | | | 363/126 |
| 2018/0145583 | A1* | 5/2018 | Nakano | H02M 1/083 |
| 2018/0316275 | A1* | 11/2018 | Yoshida | H02M 7/125 |
| 2019/0058409 | A1* | 2/2019 | Ishibashi | H02J 3/36 |
| 2021/0167690 | A1* | 6/2021 | Nakahara | H02M 1/0074 |

FOREIGN PATENT DOCUMENTS

| KR | 10-2018-0044036 A | 5/2018 |
| KR | 101873113 B1 | 8/2018 |
| WO | 2017-163508 A1 | 9/2017 |

OTHER PUBLICATIONS

Saeed Mariam et al.: "Energization and Start-up of Modular Three-stage Solid State Transformers", 2018 IEEE 19th Workshop on Control and Modeling for Power Electronics (COMPEL), IEEE, Jun. 25, 2018.
Supplementary European Search Report for EP Application No. 21892334, Aug. 29, 2024.

* cited by examiner

STARTUP METHOD OF SEMICONDUCTOR TRANSFORMER, AND CONVERTER USING SAME

FIELD OF THE INVENTION

The present invention relates to a startup method of a semiconductor transformer, and a converter using the same and, most particularly, to a method for performing initial charging of a capacitor within a semiconductor transformer without adding any separate external power source.

BACKGROUND ART

As compared to a general transformer, which is configured of coils and iron cores, the application of a semiconductor transformer is increasing in smart grids, which use various ranges of voltages and frequencies and require high-quality power supply. And, with weight reduction in distribution transformers or transformers used in electric railways, and so on, the application field of semiconductor transformers is gradually expanding.

That is, by applying the power electronics technology, since the semiconductor transformer is capable of using a frequency band that is higher than the transformer using the existing commercially accessible frequency band, the semiconductor transformer is more advantageous for downsizing and weight reduction (or weight lightening). Additionally, the semiconductor transformer is also advantageous in that high-quality power can be supplied by instantaneous voltage control, and so on, and that both input and output of direct current voltage are also available.

Meanwhile, the semiconductor transformer requires initial charging to be performed on a capacitor that is provided inside the semiconductor transformer. And, accordingly, research on the initial charging of a capacitor within a semiconductor transformer has been carried out.

As an example, an initial driving method of a semiconductor transformer for initially charging the semiconductor transformer by using secondary side grid power or chargeable external power source based on the presence or absence of a secondary side grid power voltage is mentioned in the Korean Patent Application Publication No. 10-2017-0054340.

However, the disadvantage of this case is that separate external power source is required for performing initial charging of the semiconductor transformer.

DETAILED DESCRIPTION OF THE INVENTION

Technical Objects

An object of the present invention is to provide a startup method of a semiconductor transformer, and a converter using the same performing initial charging of a capacitor within the semiconductor transformer by using input grid power without any separate external power source.

Another object of the present invention is to provide a startup method of a semiconductor transformer, and a converter using the same that can control gate drive units (GDUs) of the semiconductor transformer so as to efficiently perform initial charging of a capacitor within the semiconductor transformer, thereby enabling stable operation to be performed during startup.

Technical Solutions

A startup method of a semiconductor transformer according to an embodiment of the present invention may include a link capacitor initializing step in which a control unit controls a link capacitor voltage of a link capacitor between an AC/DC converter and a DC/DC converter connected thereto in series so as to reach an initial reference value, and stores link power, an output capacitor initializing step in which the control unit controls an output capacitor voltage of an output capacitor being configured at an output of the DC/DC converter so as to reach an initial reference value, and stores output power, a link capacitor stabilizing step in which the control unit controls the link capacitor so as to allow the link capacitor voltage of the link capacitor to reach a stable reference value, and an output capacitor stabilizing step in which the control unit controls the output capacitor so as to allow the output capacitor voltage of the output capacitor to reach a stable reference value.

Herein, in the link capacitor initializing step, the control unit may control an initial power supply switch to ON, a main power supply switch to OFF, a link capacitor controlling gate drive unit (GDU) to OFF, a high frequency generating GDU to OFF, and an output capacitor controlling GDU to OFF, and may perform charging so as to allow the link capacitor voltage of the link capacitor to reach an initial reference value.

Additionally, in the output capacitor initializing step, the control unit may control an initial power supply switch to OFF, a main power supply switch to ON, a link capacitor controlling GDU to OFF, a high frequency generating GDU to ON, and an output capacitor controlling GDU to OFF, and may perform charging so as to allow the output capacitor voltage of the output capacitor to reach an initial reference value.

Herein, in the link capacitor stabilizing step, the control unit may control an initial power supply switch to OFF, a main power supply switch to ON, a link capacitor controlling GDU to ON, a high frequency generating GDU to OFF, and an output capacitor controlling GDU to OFF, and may perform charging so as to allow the link capacitor voltage of the link capacitor to reach a stable reference value.

Additionally, in the output capacitor stabilizing step, the control unit may control an initial power supply switch to OFF, a main power supply switch to ON, a link capacitor controlling GDU to ON, a high frequency generating GDU to ON, and an output capacitor controlling GDU to ON, and may perform charging so as to allow the output capacitor voltage of the output capacitor to reach a stable reference value.

A converter according to another embodiment of the present invention may include a grid switch supplying grid power, an AC/DC converter performing AC/DC conversion of the supplied grid power, a DC/DC converter being connected in series to the AC/DC converter and performing DC/DC conversion, and a control unit controlling a switch of the grid switch and gate drive units (GDUs) of the AC/DC converter and the DC/DC converter.

Herein, the AC/DC converter may include a link capacitor storing grid power and being linked to the DC/DC converter, and a rectification and charge control unit including a link capacitor controlling GDU that rectifies the grid power and transfers the rectified grid power to the DC/DC converter or controls charging of the link capacitor.

Additionally, the DC/DC converter may include a high frequency generating unit including a high frequency generating GDU, an output capacitor storing high frequency power, a high frequency rectification and charge control unit including an output capacitor controlling GDU that rectifies the high frequency power and transfers the power to the output capacitor or controls charging of the output capacitor, and a high frequency transformer transferring an output of the high frequency generating unit to the high frequency rectification and charge control unit.

Herein, the grid switch may include an initial power supply switch supplying part of the grid power to the AC/DC converter, a main power supply switch supplying the grid power to the AC/DC converter, and a resistance being connected to the initial power supply switch so as to reduce power of the grid and supplying the power to the AC/DC converter.

Additionally, the control unit may perform control operations so as to sequentially perform a link capacitor initializing section controlling a link capacitor voltage of a link capacitor between an AC/DC converter and a DC/DC converter connected thereto in series so as to reach an initial reference value, and storing the link power, an output capacitor initializing section controlling an output capacitor voltage of an output capacitor being configured at an output of the DC/DC converter so as to reach an initial reference value, and storing the output power, a link capacitor stabilizing section controlling the link capacitor so as to allow the link capacitor voltage of the link capacitor to reach a stable reference value, and an output capacitor stabilizing section controlling the output capacitor so as to allow the output capacitor voltage of the output capacitor to reach a stable reference value.

Herein, during the link capacitor initializing section, the control unit may control an initial power supply switch to ON, a main power supply switch to OFF, a link capacitor controlling GDU to OFF, a high frequency generating GDU to OFF, and an output capacitor controlling GDU to OFF, and may perform charging so as to allow the link capacitor voltage of the link capacitor to reach an initial reference value.

Additionally, during the output capacitor initializing section, the control unit may control an initial power supply switch to OFF, a main power supply switch to ON, a link capacitor controlling GDU to OFF, a high frequency generating GDU to ON, and an output capacitor controlling GDU to OFF, and may perform charging so as to allow the output capacitor voltage of the output capacitor to reach an initial reference value.

Herein, during the link capacitor stabilizing section, the control unit may control an initial power supply switch to OFF, a main power supply switch to ON, a link capacitor controlling GDU to ON, a high frequency generating GDU to OFF, and an output capacitor controlling GDU to OFF, and may perform charging so as to allow the link capacitor voltage of the link capacitor to reach a stable reference value.

Additionally, during the output capacitor stabilizing section, the control unit may control an initial power supply switch to OFF, a main power supply switch to ON, a link capacitor controlling GDU to ON, a high frequency generating GDU to ON, and an output capacitor controlling GDU to ON, and may perform charging so as to allow the output capacitor voltage of the output capacitor to reach a stable reference value.

Effects of the Invention

According to the present invention initial charging of a capacitor within the semiconductor transformer may be performed by using input grid power without any separate external source.

Additionally, according to the present invention, stable operation may be carried out during startup by controlling gate drive units (GDUs) of the semiconductor transformer so as to efficiently perform initial charging of a capacitor within the semiconductor transformer.

MODE FOR CARRYING OUT THE INVENTION

Figure 1:
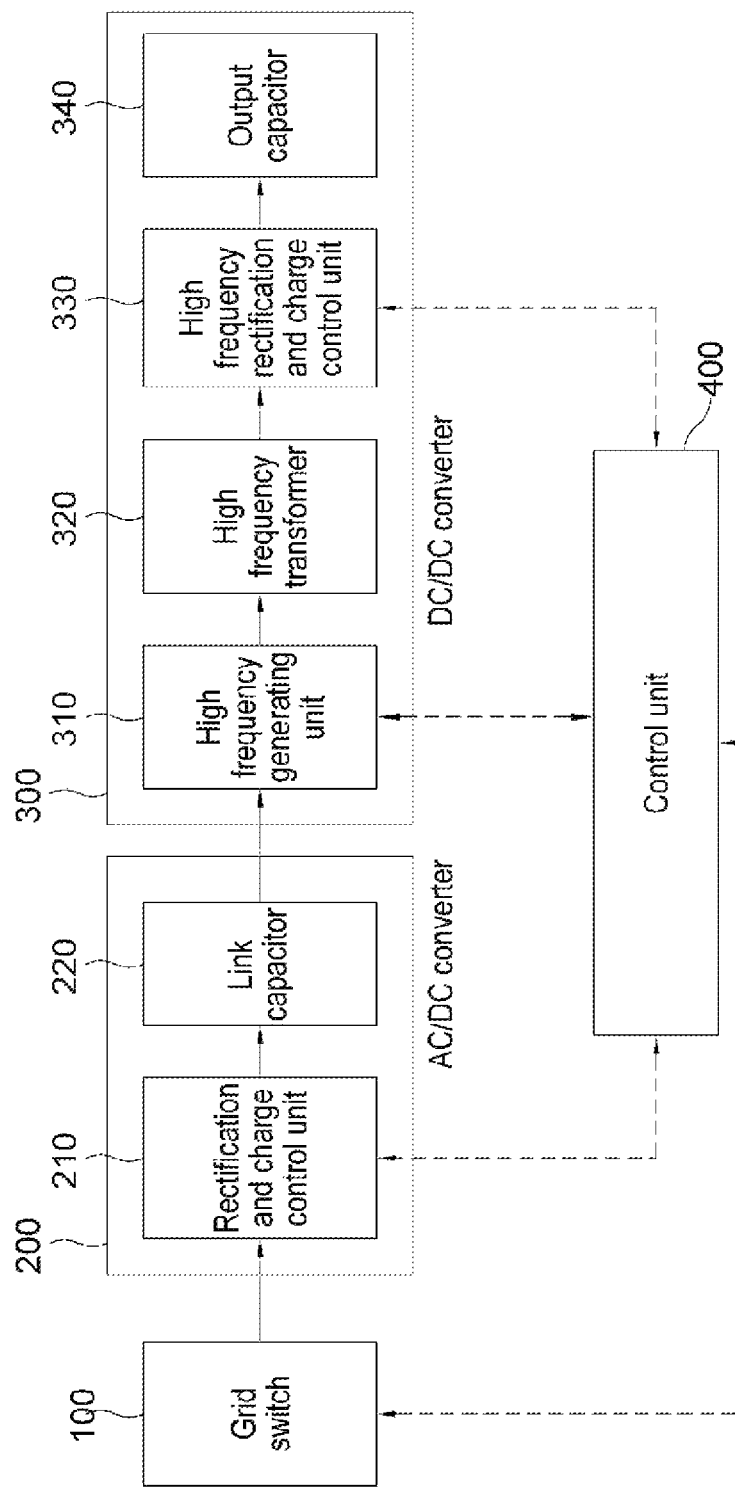
FIG. 1 is a block diagram showing a converter according to an embodiment of the present invention.

A detailed embodiment for carrying out the present invention will be described with reference to the appended drawings.

Various modifications and variations can be made in the present invention, and the present invention may have various embodiments. Therefore, examples of specific embodiments will be illustrated in the drawings and described in detail in the detailed description of the present invention. This is not intended to limit the present invention only to a specific form of embodiment. And, thus, it may be understood that the embodiments include all modifications and variations, equivalents and substitutions of the invention provided that they come within the spirit and technical scope of the present invention.

Hereinafter, a startup method of a semiconductor transformer, and a converter using the same according to the present invention will be described in detail with reference to the appended drawings.

FIG. 1 is a block diagram showing a converter according to an embodiment of the present invention. Hereinafter, the startup method of a semiconductor transformer, and the converter using the same according to the present invention will be described with reference to FIG. 1.

Firstly, referring to FIG. 1, a converter according to an embodiment of the present invention may include a grid switch 100 supplying grid power, an AC/DC converter 200 performing AC/DC conversion of the supplied grid power, a DC/DC converter 300 being connected in series to the AC/DC converter 200 and performing DC/DC conversion, and a control unit 400 controlling a switch of the grid switch and gate drive units (GDUs) of the AC/DC converter 200 and the DC/DC converter 300.

Herein, the AC/DC converter 200 may include a rectification and charge control unit 210 including a link capacitor controlling GDU that rectifies the grid power and transfers the power to the DC/DC converter or controls charging of a link capacitor 220, and a link capacitor 200 storing power and being linked to the DC/DC converter 300.

Additionally, the DC/DC converter 300 may include a high frequency generating unit 311 including a high frequency generating gate drive unit (GDU), a high frequency transformer 320 transferring an output of the high frequency generating unit 311 to a high frequency rectification and charge control unit 331, a high frequency rectification and charge control unit 331 including an output capacitor controlling GDU that rectifies the high frequency power and transfers the power to an output capacitor 332 or controls charging of an output capacitor 332, and an output capacitor 332 storing the high frequency power.

At this point, the high frequency generating unit 311 may be referred to as a primary side of the DC/DC converter 300, which is the input of the high frequency transformer 320, and the high frequency rectification and charge control unit 331 and the output capacitor 332 may be referred to as a secondary side of the DC/DC converter 300, which is the output part of the high frequency transformer 320. By having the primary side of the DC/DC converter 300 perform a function of generating direct current to a high frequency, and by having the secondary side of the DC/DC converter 300 convert the high frequency back to the direct current by the high frequency rectification and charge control unit 331, the DC/DC conversion may be performed.

Herein, since the AC/DC converter 200 being connected to the grid is connected in series to the DC/DC converter 300, and since the AC/DC converter 200 and the DC/DC converter 300 are configured of a semiconductor transformer, in order to perform stable operation, initial charging of the link capacitor 220 that is equipped to the AC/DC converter 200 and initial charging of the output capacitor 332 that is equipped to the DC/DC converter 300 are needed.

In the present invention, by having the control unit 400 control a switch that is positioned within the grid switch 100, a link capacitor controlling gate drive unit (GDU) that is positioned within the AC/DC converter 200, and a high frequency generating GDU that is positioned within the DC/DC converter 300, a capacitor may be charged without any separate external power source.

Hereinafter, operations of a switch for charging the link capacitor 220 and the output capacitor 332 without any separate external power source according to the present invention will be described in detail with reference to FIG. 2.

Figure 2:
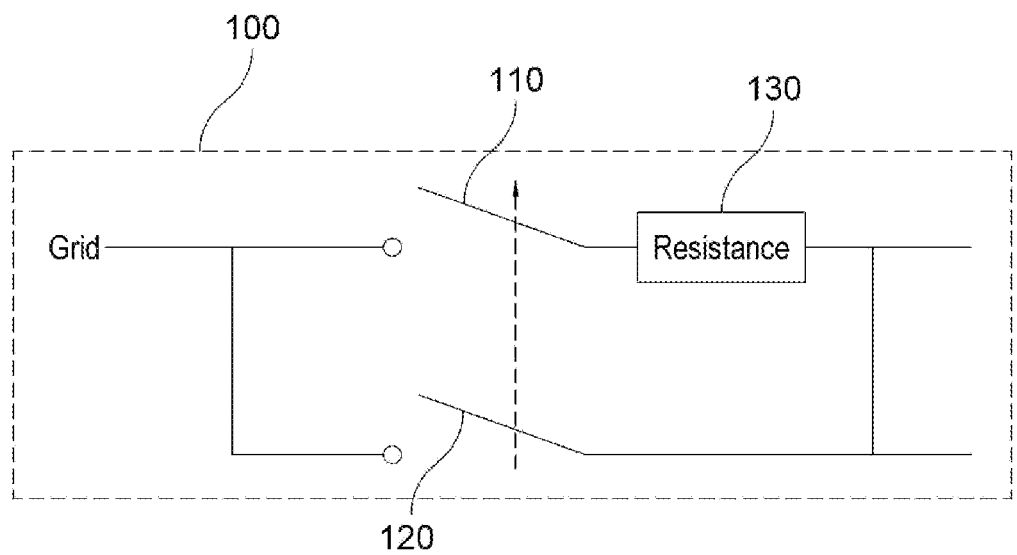
FIG. 2 is a diagram showing a detailed view of a grid switch of FIG. 1.

FIG. 2 is a diagram showing a detailed view of a grid switch 100 of FIG. 1.

As shown in FIG. 2, the grid switch 100 may include an initial power supply switch 110 supplying part (or some) of grid power to the AC/DC converter 200, a main power supply switch 120 supplying the grid power to the AC/DC converter 200, and a resistance 130 being connected to the initial power supply switch so as to reduce the power of the grid and supplying the power to the AC/DC converter 200.

In order to perform initial charging of the link capacitor 220, only partial power (or part) of the full grid power may need to be supplied to the AC/DC converter 200 from the grid switch 100. And, accordingly, in the present invention, in case the grid power is supplied to the AC/DC converter 200 from the grid switch 100, by supplying the power by connecting in series the initial power supply switch 110 and the resistance 130, the link capacitor 220 may be easily initialized by using low power.

Additionally, in the present invention, after the initialization of the link capacitor 220 is completed, the initial power supply switch 110 is turned OFF, and the main power supply switch 120 is turned ON for the initialization of the output capacitor 332 and the stabilization of the link capacitor 220 and output capacitor 332, so that the grid power can be directly transferred to the AC/DC converter 200. Thus, the capacitors of the AC/DC converter 200 and the DC/DC converter 300 may be stabilized.

Figure 3:
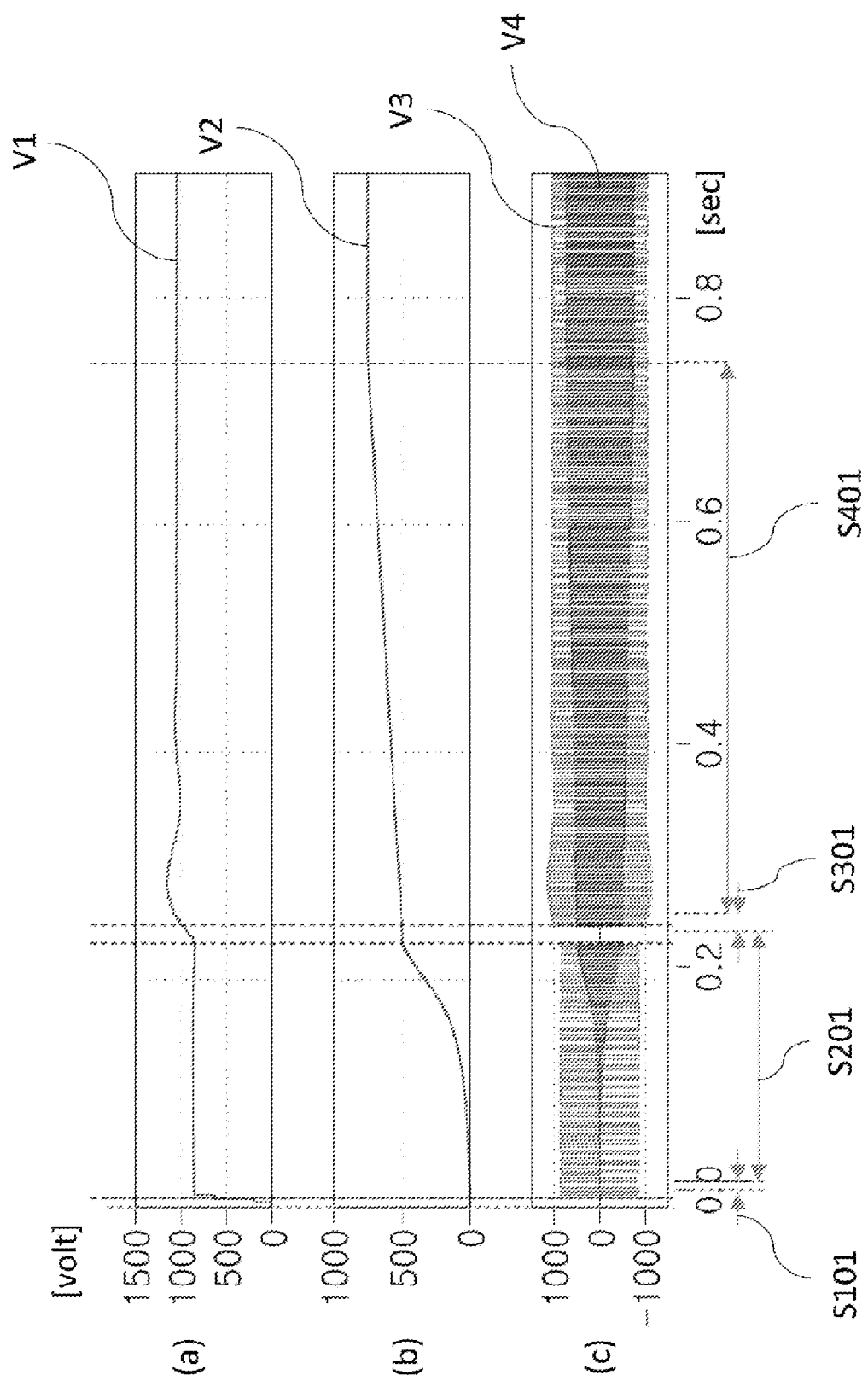
FIG. 3 is a flow chart showing a startup method of a semiconductor transformer according to an embodiment of the present invention.
Figure 4:
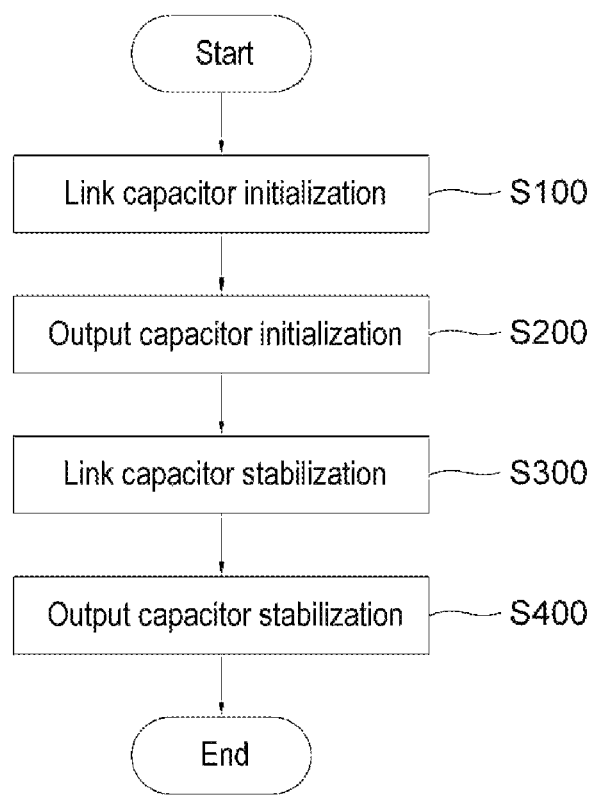
FIG. 4 is a graph showing signal waveforms being measured in an AC/DC converter and a DC/DC converter during the startup of the semiconductor transformer shown in FIG. 3.

FIG. 3 is a flow chart showing a startup method of a semiconductor transformer according to an embodiment of the present invention, and FIG. 4 is a graph showing signal waveforms being measured in an AC/DC converter 200 and a DC/DC converter 300 during the startup of the semiconductor transformer shown in FIG. 3.

As shown in FIG. 3, the startup method of a semiconductor transformer according to the present invention may include a link capacitor initializing step (S100) in which the control unit 400 controls a link capacitor voltage (V1) of the link capacitor 220 between the AC/DC converter 200 and the DC/DC converter 300 connected thereto in series so as to reach an initial reference value, and stores link power, an output capacitor initializing step (S200) in which the control unit 400 controls an output capacitor voltage (V2) of the output capacitor 332 being configured at the output of the DC/DC converter 300 so as to reach an initial reference value, and stores output power, a link capacitor stabilizing step (S300) in which the control unit 400 controls the link capacitor 220 so as to allow the link capacitor voltage (V1) of the link capacitor 220 to reach a stable reference value, and an output capacitor stabilizing step (S400) in which the control unit 400 controls the output capacitor 332 so as to allow the output capacitor voltage V2 of the output capacitor 332 to reach a stable reference value.

At this point, in the link capacitor initializing step (S100), the control unit 400 controls an initial power supply switch 110 to ON, a main power supply switch 120 to OFF, a link capacitor controlling GDU to OFF, a high frequency generating GDU to OFF, and an output capacitor controlling GDU to OFF, and, during a link capacitor initializing section (S101), the control unit 400 performs charging so as to allow the link capacitor voltage (V1) of the link capacitor 220 to reach an initial reference value.

In the output capacitor initializing step (S200), the control unit 400 controls the initial power supply switch 110 to OFF, the main power supply switch to ON, the link capacitor controlling GDU to OFF, the high frequency generating GDU to ON, and the output capacitor controlling GDU to OFF, and, during an output capacitor initializing section (S201), the control unit 400 performs charging so as to allow the output capacitor voltage (V2) of the output capacitor 332 to reach an initial reference value.

In the link capacitor stabilizing step (S300), the control unit 400 controls the initial power supply switch 110 to OFF, the main power supply switch 120 to ON, the link capacitor controlling GDU to ON, the high frequency generating GDU to OFF, and the output capacitor controlling GDU to OFF, and, during a link capacitor stabilizing section (S301), the control unit 400 performs charging so as to allow the link capacitor voltage (V1) of the link capacitor 220 to reach a stable reference value.

Additionally, in the output capacitor stabilizing step (S400), the control unit 400 controls the initial power supply switch to OFF, the main power supply switch to ON, the link capacitor controlling GDU to ON, the high frequency generating GDU to ON, and the output capacitor controlling GDU to ON, and, during an output capacitor stabilizing section (S401), the control unit 400 performs charging so as to allow the output capacitor voltage (V2) of the output capacitor 332 to reach a stable reference value.

Meanwhile, referring to FIG. 4, the startup method of the semiconductor transformer according to the present invention may be divided into a link capacitor initializing section (S101), an output capacitor initializing section (S201), a link capacitor stabilizing section (S301), and an output capacitor stabilizing section (S401), and be described accordingly.

In FIG. 4, (a) represents a link capacitor voltage (V1) of the link capacitor 220, (b) represents an output capacitor voltage (V2) of the output capacitor 332, and (c) represents a DC/DC conversion primary side waveform (V3) and a DC/DC conversion secondary side waveform (V4), which are waveforms each before and after the high frequency transformer 320.

During the link capacitor initializing section (S101), since the link capacitor controlling gate drive unit (GDU) is turned OFF, the rectification and charge control unit 210 may operate by using only a rectifier circuit. Therefore, part of the grid power that is input to the AC/DC converter 200 may be rectified by the rectification and charge control unit 210, and the link capacitor voltage (V1) may be charged to an initial reference value.

During the output capacitor initializing section (S201), the output capacitor voltage (V2) may be initialized based on the initialized link capacitor voltage (V1). At this point, the high frequency generating GDU is turned ON, thereby allowing a high frequency to be generated from the high frequency generating unit 311 based on the link capacitor voltage (V1). Meanwhile, since the output capacitor controlling GDU is turned OFF, the high frequency rectification and charge control unit 331 may operate by using only a rectifier circuit. Therefore, the high frequency power that is input to the high frequency rectification and charge control unit 331 may be rectified, thereby enabling the output capacitor voltage (V2) of the output capacitor 332 to be charged to an initial reference value.

Thereafter, during the link capacitor stabilizing section (S301), since the link capacitor controlling GDU is turned ON, the rectification and charge control unit 210 may control the link capacitor voltage (V1) of the link capacitor 220. Accordingly, the rectification and charge control unit 210 may control the charging, based on the grid power that is input to the AC/DC converter 200, so that the link capacitor voltage (V1) can reach a stable reference value from the initial reference value.

During the output capacitor stabilizing section (S401), since the output capacitor controlling GDU is turned ON, the high frequency rectification and charge control unit 331 may control the output capacitor voltage (V2) of the output capacitor 332. Accordingly, the high frequency rectification and charge control unit 331 may control the charging, based on the high frequency power that is input to the high frequency rectification and charge control unit 331, so that the output capacitor voltage (V2) can reach a stable reference value from the initial reference value.

Meanwhile, the DC/DC conversion primary side waveform (V3) and the DC/DC conversion secondary side waveform (V4) are generated as high frequency only during the output capacitor initializing section (S201) and the output capacitor stabilizing section (S401), wherein the high frequency generating GDU is in an ON state. And, since the DC/DC conversion primary side waveform (V3) and the DC/DC conversion secondary side waveform (V4) are waveforms before and after the high frequency transformer 320, respectively, an envelope of the DC/DC conversion primary side waveform (V3) is the same as the link capacitor voltage (V1), and an envelope of the DC/DC conversion secondary side waveform (V4) is the same as the output capacitor voltage (V2).

As described above, by controlling the switch within the grid switch and the GDUs within the AC/DC converter 200 and DC/DC converter 300, the startup method of a semiconductor transformer and the converter using the same according to the present invention have the advantage of initializing and stabilizing the capacitors of the AC/DC converter 200 and DC/DC converter 300 without any separate external power source.

FIG. 5 to FIG. 8. are detailed flowcharts for describing in more detail the startup method of the semiconductor transformer of FIG. 3.

Figure 5:
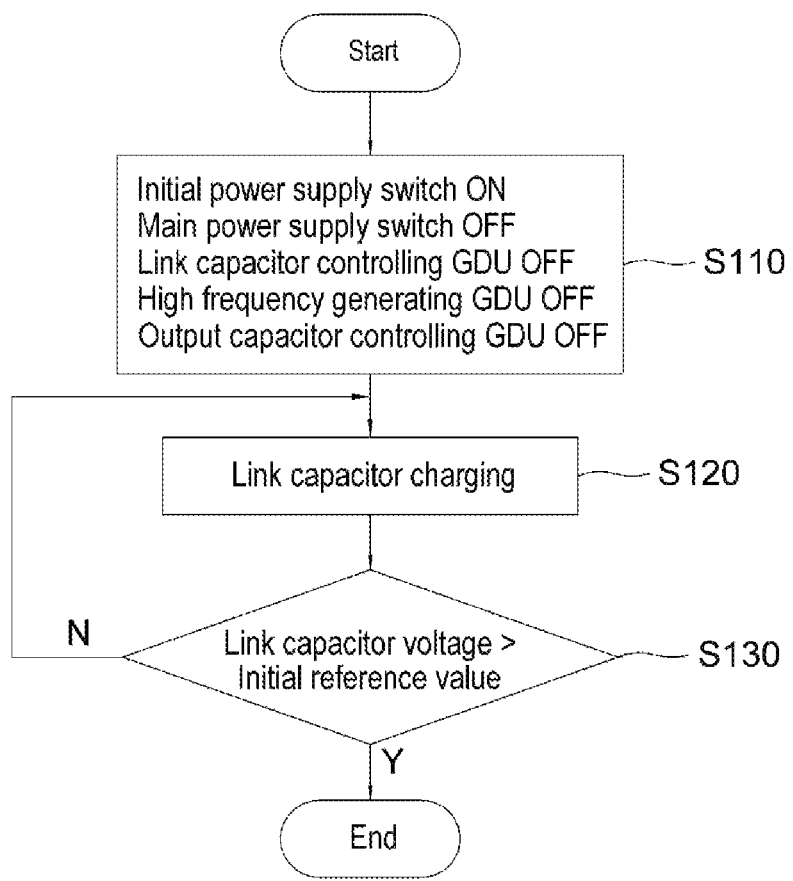
FIG. 5 is a flow chart showing a link capacitor initializing step of FIG. 3.

FIG. 5 is a flow chart showing a link capacitor initializing step (S100) of FIG. 3.

As shown in FIG. 5, in the link capacitor initializing step (S100), the control unit 400 controls an initial power supply switch 110 to ON, a main power supply switch 120 to OFF, a link capacitor controlling GDU to OFF, a high frequency generating GDU to OFF, and an output capacitor controlling GDU to OFF (S110), charges the link capacitor 220 (S120), and, thereafter, determines whether the link capacitor voltage (V1) has reached an initial reference value (S130), thereby performing charging so as to allow the link capacitor voltage (V1) of the link capacitor 220 to reach the initial reference value.

That is, in the link capacitor initializing step (S100), since the link capacitor controlling GDU is turned OFF, the rectification and charge control unit 210 may operate by using only a rectifier circuit. Therefore, part of the grid power that is input to the AC/DC converter 200 may be rectified by the rectification and charge control unit 210, and the link capacitor voltage (V1) may be charged to the initial reference value.

Meanwhile, low power is supplied from the grid switch 100, so as to charge the link capacitor 220 up to the initial reference value. Herein, however, by turning OFF the DC/DC converter 300, this may have an effect of preventing the DC/DC converter 300 from operating unstably.

Figure 6:
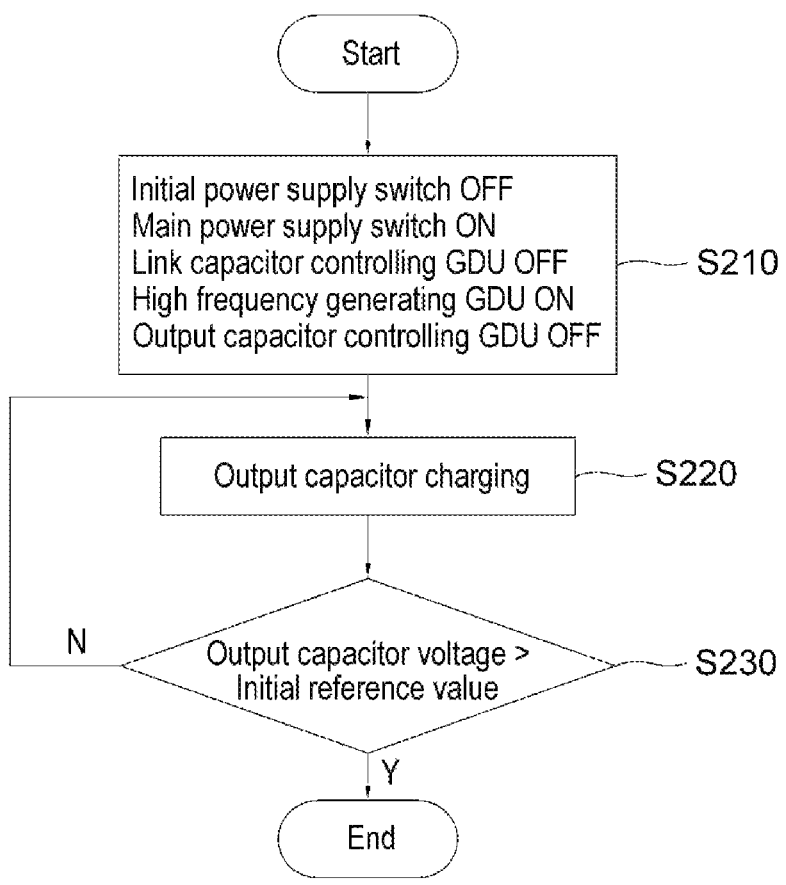
FIG. 6 is a flow chart showing an output capacitor initializing step of FIG. 3.

FIG. 6 is a flow chart showing an output capacitor initializing step (S200) of FIG. 3.

As shown in FIG. 6, in the output capacitor initializing step (S200), the control unit 400 controls the initial power supply switch 110 to OFF, the main power supply switch to ON, the link capacitor controlling GDU to OFF, the high frequency generating GDU to ON, and the output capacitor controlling GDU to OFF (S210), charges the output capacitor 332 (S220), and, thereafter, determines whether the output capacitor voltage (V2) has reached an initial reference value (S230), thereby performing charging so as to allow the output capacitor voltage (V2) of the output capacitor 332 to reach the initial reference value.

That is, in the output capacitor initializing step (S200), the output capacitor voltage (V2) may be initialized based on the initialized link capacitor voltage (V1). At this point, the high frequency generating GDU is turned ON, thereby allowing a high frequency to be generated from the high frequency generating unit 311 based on the link capacitor voltage (V1). Meanwhile, since the output capacitor controlling GDU is turned OFF, the high frequency rectification and charge control unit 331 may operate by using only a rectifier circuit. Therefore, the high frequency power that is input to the high frequency rectification and charge control unit 331 may be rectified, thereby enabling the output capacitor voltage (V2) of the output capacitor 332 to be charged to the initial reference value.

Meanwhile, grid power is supplied to the AC/DC converter 200 from the grid switch 100. Herein, however, by turning OFF both the link capacitor controlling GDU and the output capacitor controlling GDU, until the voltage of the output capacitor 332 is charged to the initial reference value, this may have an effect of preventing unstable operations caused by the output capacitor 332 that is yet to be initialized.

Figure 7:
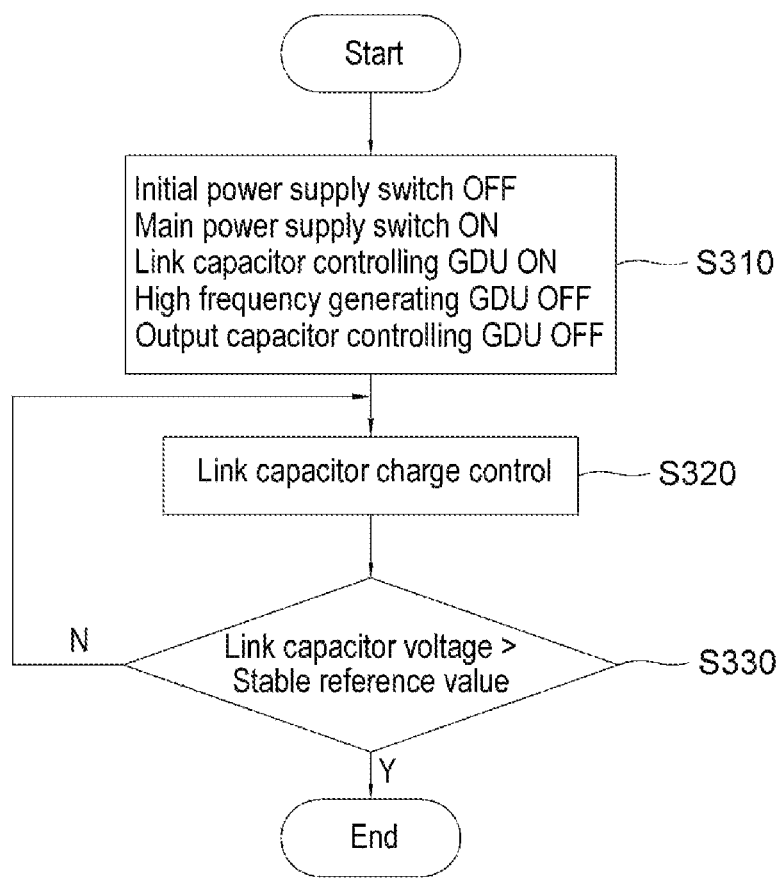
FIG. 7 is a flow chart showing a link capacitor stabilizing step of FIG. 3.

FIG. 7 is a flow chart showing a link capacitor stabilizing step (S300) of FIG. 3.

As shown in FIG. 7, in the link capacitor stabilizing step (S300), the control unit 400 controls the initial power supply switch 110 to OFF, the main power supply switch 120 to ON, the link capacitor controlling GDU to ON, the high frequency generating GDU to OFF, and the output capacitor controlling GDU to OFF (S310), controls charging of the link capacitor 220 (S320), and, thereafter, determines whether the link capacitor voltage (V1) has reached a stable reference value (S330), thereby performing charging so as to allow the link capacitor voltage (V1) of the link capacitor 220 to reach the stable reference value.

That is, in the link capacitor stabilizing step (S300), since the link capacitor controlling GDU is turned ON, the rectification and charge control unit 210 may control the link capacitor voltage (V1) of the link capacitor 220. Accordingly, the rectification and charge control unit 210 may control the charging, based on the grid power that is input to the AC/DC converter 200, so that the link capacitor voltage (V1) can reach the stable reference value from the initial reference value.

Meanwhile, by turning OFF all GDUs within the DC/DC converter 300, this may have an effect of preventing unstable operations caused by the output capacitor 332 that is yet to be stabilized.

Figure 8:
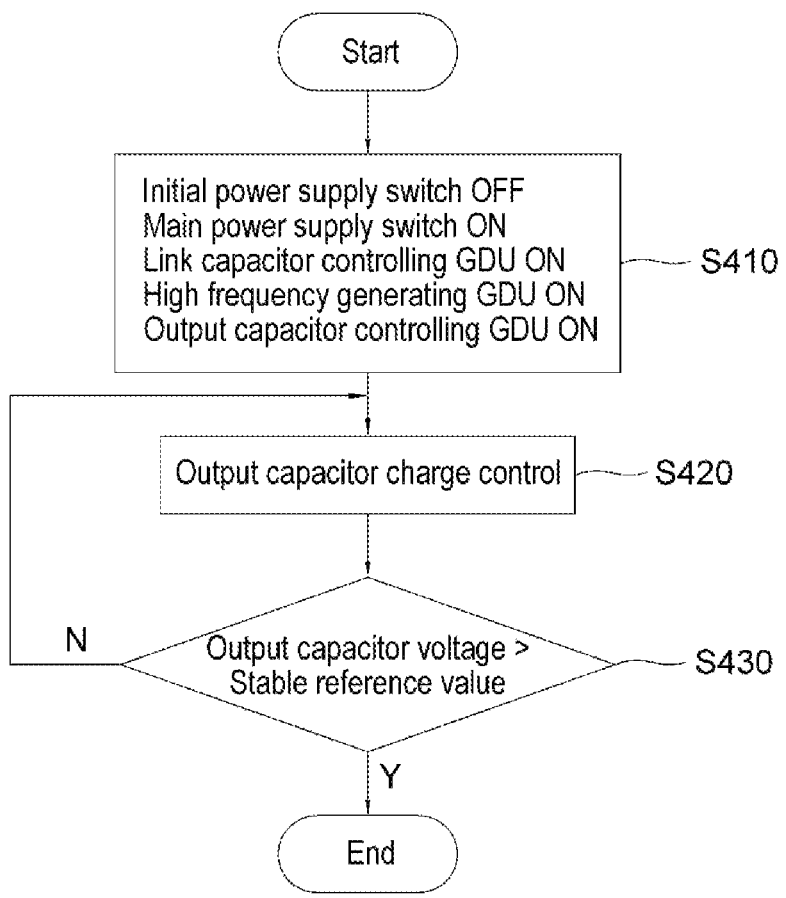
FIG. 8 is a flow chart showing an output capacitor stabilizing step of FIG. 3.

FIG. 8 is a flow chart showing an output capacitor stabilizing step (S400) of FIG. 3.

As shown in FIG. 8, in the output capacitor stabilizing step (S400), the control unit 400 controls the initial power supply switch to OFF, the main power supply switch to ON, the link capacitor controlling GDU to ON, the high frequency generating GDU to ON, and the output capacitor controlling GDU to ON (S410), controls charging of the output capacitor (S420), and, therefore, determines whether the output capacitor voltage (V2) has reached a stable reference value (S430), thereby performing charging so as to allow the output capacitor voltage (V2) of the output capacitor 332 to reach the stable reference value.

That is, in the output capacitor stabilizing step (S400), since the output capacitor controlling GDU is turned ON, the high frequency rectification and charge control unit 331 may control the output capacitor voltage (V2) of the output capacitor 332. Accordingly, the high frequency rectification and charge control unit 331 may control the charging, based on the high frequency power that is input to the high frequency rectification and charge control unit 331, so that the output capacitor voltage (V2) can reach the stable reference value from the initial reference value.

Therefore, by operating all GDUs of the AC/DC converter 200 and the DC/DC converter 300 until the output capacitor 332 is stabilized based on the stabilized link capacitor 220 and the initialized output capacitor 332, this has an advantage of enabling the capacitors of the AC/DC converter 200 and the DC/DC converter 300 to be initialized and stabilized without any separate external power source.

As described above, the startup method of a semiconductor transformer, and the converter using the same according to the present invention may charge capacitors within the semiconductor transformer by using input grid power without any separate power source. And, additionally, the startup method of a semiconductor transformer, and the converter using the same according to the present invention may efficiently perform initial charging of the capacitors within the semiconductor transformer by controlling gate drive units (GDUs) of the semiconductor transformer, thereby enabling stable operations to be performed during startup.

The description presented above includes a practical example of one or more exemplary embodiments. Evidently, it may be acknowledged that all possible combinations of components or methods will not be described merely for the purpose of describing the above-described exemplary embodiments, and that numerous additional combinations and substitutions (or replacements) of various embodiments may be made by anyone with ordinary skills in the art. Therefore, the above-described embodiments include all alternatives, variations, and modifications that fall within the scope and spirit of the appended claims of the present invention.

INDUSTRIAL APPLICABILITY

The present invention relates to a startup method of a semiconductor transformer, and a converter using the same and is applicable to a semiconductor transformer.

What is claimed is:

1. A startup method of a semiconductor transformer, comprising: a link capacitor initializing step in which a control unit controls a link capacitor voltage of a link capacitor between an AC/DC converter and a DC/DC converter connected thereto in series so as to reach an initial reference value, and stores link power; an output capacitor initializing step in which the control unit controls an output capacitor voltage of an output capacitor being configured at an output of the DC/DC converter so as to reach an initial reference value, and stores output power; a link capacitor stabilizing step in which the control unit controls the link capacitor so as to allow the link capacitor voltage of the link capacitor to reach a stable reference value; and an output capacitor stabilizing step in which the control unit controls the output capacitor so as to allow the output capacitor voltage of the output capacitor to reach a stable reference value-; wherein, in the link capacitor initializing step, the control unit controls an initial power supply switch to ON, a main power supply switch to OFF, a link capacitor controlling gate drive unit (GDU) to OFF, a high frequency generating GDU to OFF, and an output capacitor controlling GDU to OFF, and performs charging so as to allow the link capacitor voltage of the link capacitor to reach an initial reference value; wherein, in the output capacitor initializing step, the control unit controls an initial power supply switch to OFF, a main power supply switch to ON, a link capacitor controlling GDU to OFF, a high frequency generating GDU to ON, and an output capacitor controlling GDU to OFF, and performs charging so as to allow the output capacitor voltage of the output capacitor to reach an initial reference value; wherein, in the link capacitor stabilizing step, the control unit controls an initial power supply switch to OFF, a main power supply switch to ON, a link capacitor controlling GDU to ON, a high frequency generating GDU to OFF, and an output capacitor controlling GDU to OFF, and performs charging so as to allow the link capacitor voltage of the link capacitor to reach a stable reference value; wherein, in the output capacitor stabilizing step, the control unit controls an initial power supply switch to OFF, a main power supply switch to ON, a link capacitor controlling GDU to ON, a high frequency generating GDU to ON, and an output capacitor controlling GDU to ON, and performs charging so as to allow the output capacitor voltage of the output capacitor to reach a stable reference value.

2. A converter, comprising: a grid switch supplying grid power; an AC/DC converter performing AC/DC conversion of the supplied grid power; a DC/DC converter being connected in series to the AC/DC converter and performing DC/DC conversion; and a control unit controlling a switch of the grid switch and gate drive units (GDUs) of the AC/DC converter and the DC/DC converter; wherein the AC/DC converter comprises: a link capacitor storing power and being linked to the DC/DC converter; and a rectification and charge control unit including a link capacitor controlling GDU that rectifies the grid power and transfers the rectified grid power to the DC/DC converter or controls charging of the link capacitor; wherein the DC/DC converter comprises: a high frequency generating unit including a high frequency generating GDU; an output capacitor storing high frequency power; a high frequency rectification and charge control unit including an output capacitor controlling GDU that rectifies the high frequency power and transfers the power to the output capacitor or controls charging of the output capacitor; and a high frequency transformer transferring an output of the high frequency generating unit to the high frequency rectification and charge control unit; wherein the control unit performs control operations so as to sequentially perform: a link capacitor initializing section controlling a link capacitor voltage of a link capacitor between an AC/DC converter and a DC/DC converter connected thereto in series so as to reach an initial reference value, and storing the link power; an output capacitor initializing section controlling an output capacitor voltage of an output capacitor being configured at an output of the DC/DC converter so as to reach an initial reference value, and storing the output power; a link capacitor stabilizing section controlling the link capacitor so as to allow the link capacitor voltage of the link capacitor to reach a stable reference value; and an output capacitor stabilizing section controlling the output capacitor so as to allow the output capacitor voltage of the output capacitor to reach a stable reference value; wherein, during the link capacitor initializing section, the control unit controls an initial power supply switch to ON, a main power supply switch to OFF, a link capacitor controlling GDU to OFF, a high frequency generating GDU to OFF, and an output capacitor controlling GDU to OFF, and performs charging so as to allow the link capacitor voltage of the link capacitor to reach an initial reference value; wherein, during the output capacitor initializing section, the control unit controls an initial power supply switch to OFF, a main power supply switch to ON, a link capacitor controlling GDU to OFF, a high frequency generating GDU to ON, and an output capacitor controlling GDU to OFF, and performs charging so as to allow the output capacitor voltage of the output capacitor to reach an initial reference value; wherein, during the link capacitor stabilizing section, the control unit controls an initial power supply switch to OFF, a main power supply switch to ON, a link capacitor controlling GDU to ON, a high frequency generating GDU to OFF, and an output capacitor controlling GDU to OFF, and performs charging so as to allow the link capacitor voltage of the link capacitor to reach a stable reference value; wherein, during the output capacitor stabilizing section, the control unit controls an initial power supply switch to OFF, a main power supply switch to ON, a link capacitor controlling GDU to ON, a high frequency generating GDU to ON, and an output capacitor controlling GDU to ON, and performs charging so as to allow the output capacitor voltage of the output capacitor to reach a stable reference value.

3. The converter of claim 2, wherein the grid switch comprises:
an initial power supply switch supplying part of the grid power to the AC/DC converter;
a main power supply switch supplying the grid power to the AC/DC converter; and
a resistance being connected to the initial power supply switch so as to reduce power of the grid and supplying the power to the AC/DC converter.

* * * * *